(12) United States Patent
Zhang et al.

(10) Patent No.: US 9,260,149 B2
(45) Date of Patent: Feb. 16, 2016

(54) CRADLE-TYPE VEHICLE FRAME AND CANOPY STRUCTURE

(75) Inventors: Xueqing Zhang, Suzhou (CN); Anding Zhu, Suzhou (CN); Xue Li, Suzhou (CN)

(73) Assignee: Suzhou Eagle Electric Vehicle Manufacturing Co., Ltd., Suzhou, Jiangsu (CN)

( * ) Notice: Subject to any disclaimer, the term of this patent is extended or adjusted under 35 U.S.C. 154(b) by 66 days.

(21) Appl. No.: 13/985,043

(22) PCT Filed: Jul. 8, 2011

(86) PCT No.: PCT/CN2011/001127
§ 371 (c)(1),
(2), (4) Date: Oct. 21, 2013

(87) PCT Pub. No.: WO2012/119276
PCT Pub. Date: Sep. 13, 2012

(65) Prior Publication Data
US 2014/0306489 A1    Oct. 16, 2014

(30) Foreign Application Priority Data

Mar. 4, 2011  (CN) .......................... 2011 1 0052250
Mar. 8, 2011  (CN) ...................... 2011 2 0058606 U
Mar. 8, 2011  (CN) ...................... 2011 2 0058613 U

(51) Int. Cl.
*B62J 17/00*    (2006.01)
*B62J 17/08*    (2006.01)
(Continued)

(52) U.S. Cl.
CPC *B62J 17/08* (2013.01); *B62J 17/04* (2013.01); *B62K 11/02* (2013.01); *B62K 11/04* (2013.01); *B62K 19/40* (2013.01); *B62J 2017/086* (2013.01)

(58) Field of Classification Search
CPC ...... B62J 17/08; B62J 17/04; B62J 2017/086; B62K 11/04; B62K 11/02; B62K 19/40
USPC .................................. 296/193.12, 77.1, 78.1
See application file for complete search history.

(56) References Cited

U.S. PATENT DOCUMENTS 4,973,082 A * 11/1990 Kincheloe ..................... 280/756
6,402,220 B2 * 6/2002 Allen ........................... 296/77.1

FOREIGN PATENT DOCUMENTS

CN          85205513         4/1987
CN          2446018 Y        9/2001
(Continued)

OTHER PUBLICATIONS

ISR for related PCT/CN2011/001127 issued on Dec. 8, 2011 with its English translation.
(Continued)

*Primary Examiner* — Joseph D Pape
*Assistant Examiner* — Dana Ivey
(74) *Attorney, Agent, or Firm* — Ladas & Parry, LLP

(57) ABSTRACT

A canopy structure comprising a framework which includes a pair of spacedly disposed, curved tubes, a connecting member disposed between the respective forward ends of the two tubes, and a cross-member connectedly disposed between the two tubes at the highest point thereof. A forward horizontal beam is mounted on the cross-member and a rear horizontal beam is mounted at a position between the two tubes and to the rear of the forward horizontal beam. An adhesive strip is disposed upon each tube by enveloping means, and forward and rear glass panels are fixedly arranged on the canopy structure by means of said adhesive strips and by the forward and rear horizontal beams respectively. Also disclosed are a canopy assembly structure using a fixed column to fixedly connect one component having a metallic spacer with spacing holes to another component having mounting holes, and a cradle-type vehicle frame having a backrest framework.

11 Claims, 5 Drawing Sheets

(51) Int. Cl.
*B62J 17/04* (2006.01)
*B62K 11/04* (2006.01)
*B62K 19/40* (2006.01)
*B62K 11/02* (2006.01)

(56) References Cited

FOREIGN PATENT DOCUMENTS

| | | |
|---|---|---|
| CN | 2639150 Y | 9/2004 |
| CN | 2719697 Y | 8/2005 |
| CN | 2737657 | 11/2005 |
| CN | 201419757 Y | 3/2010 |
| DE | 3411046 | 9/1985 |
| GB | 2241477 A | 9/1991 |
| WO | 02/081293 | 10/2002 |

OTHER PUBLICATIONS

IPRP for related PCT/CN2011/001127 issued on Sep. 10, 2013 with its English translation.

* cited by examiner

CRADLE-TYPE VEHICLE FRAME AND CANOPY STRUCTURE

CROSS-REFERENCE TO RELATED APPLICATIONS

This application is the U.S. National Stage of International Patent Application No. PCT/CN2011/001127 filed on Jul. 8, 2011, which claims priority to Chinese Patent Application No. 201110052250.6, filed on Mar. 4, 2011, Chinese Patent Application No. 201120058606.2, filed on Mar. 8, 2011 and Chinese Patent Application No. 201120058613.2, filed on Mar. 8, 2011, the disclosures of which are hereby incorporated by reference in their entireties.

FIELD OF THE INVENTION

The present invention relates to a cradle-type vehicle frame and a canopy structure of an electrical bicycle, and more particularly to an assembling structure thereof.

BACKGROUND OF THE INVENTION

In order that electrical bicycles can also be used by consumers under adverse weather, electrical bicycles experience new development. For example, the electrical bicycle further adds a canopy structure on top of the vehicle frame for avoiding wind and rain so as to bring greater convenience to the consumers.

The canopy structure may include a bracket and a glass or a awning fabric mounted on the bracket etc. However, the conventional canopy structure is not compact and may include a metal round tube framework, a plastic horizontal beam and a plastic inner plate. The plastic horizontal beam and the plastic inner plate are usually attached to the round tube framework through glue. As a result, the operating process is complex. Besides, the fixation performance is not reliable so that the overall strength of the structure is not enough to meet the demand. Furthermore, the function of the canopy structure is single and cannot meet growing consumer demands.

The conventional electrical bicycle includes a main vehicle frame, a front assembly located at the front of the main vehicle frame and a rear wheel assembly located at the rear of the main vehicle frame. The main vehicle frame usually includes a plurality of metal tubes soldered or fastened together for connecting the front assembly and the rear wheel assembly. The main vehicle frame also undertakes the weight of the vehicle body and the human body. Since the weight capacity and the pressure capacity of the metal tubes is limited, the vehicle frame consisting of such metal tubes is easily broken, which may affect the service life thereof. Besides, the conventional seat of the electrical bicycle usually lacks of a backrest and may bring uncomfortable driving feelings of the driver.

Hence, a new canopy structure and a cradle-type vehicle frame are desired to solve the above problem.

BRIEF SUMMARY OF THE INVENTION

An object of the present application is to provide a canopy structure with reliable fixation and compact structure, and a cradle-type vehicle frame with comfortable riding feelings.

In order to solve the above technical problems, a canopy structure according to the present application is provided. The canopy structure includes a framework which has a pair of round tubes spaced apart from and parallel to each other. Each of the round tube has a curved portion, a bridge portion and a vertical portion extending in a vertical direction. The bridge portions connect with and are located between the curved portion and the vertical portion. An angle between the vertical portion and curved portion is acute. The framework further includes a connecting member connecting with free ends of the curved portions of the pair of round tubes and is perpendicular to the pair of round tubes, a cross-bar connecting a middle portion of the curved portions of the pair of round tubes and perpendicular to the pair of round tubes, a front ceiling beam crossing the pair of round tubes and engaged with the cross-bar and a rear ceiling beam crossing the pair of round tubes and being located at the bridge portion of the pair of round tubes. The canopy structure further includes a pair of adhesive strips disposed upon the round tubes from the bridge portion to the free end of curved portions, a rear glass hold in position by the adhesive strips and the rear ceiling beam together and a front glass hold in position by the adhesive strips and the front ceiling beam together.

Comparing with the prior arts, via the framework mounted with a plurality of components, the canopy structure according to the present application can be provided with overall strong structure, and thereby the canopy structure can be more reliable and more durable.

DETAILED DESCRIPTION OF THE PREFERRED EMBODIMENT

Figure 1:
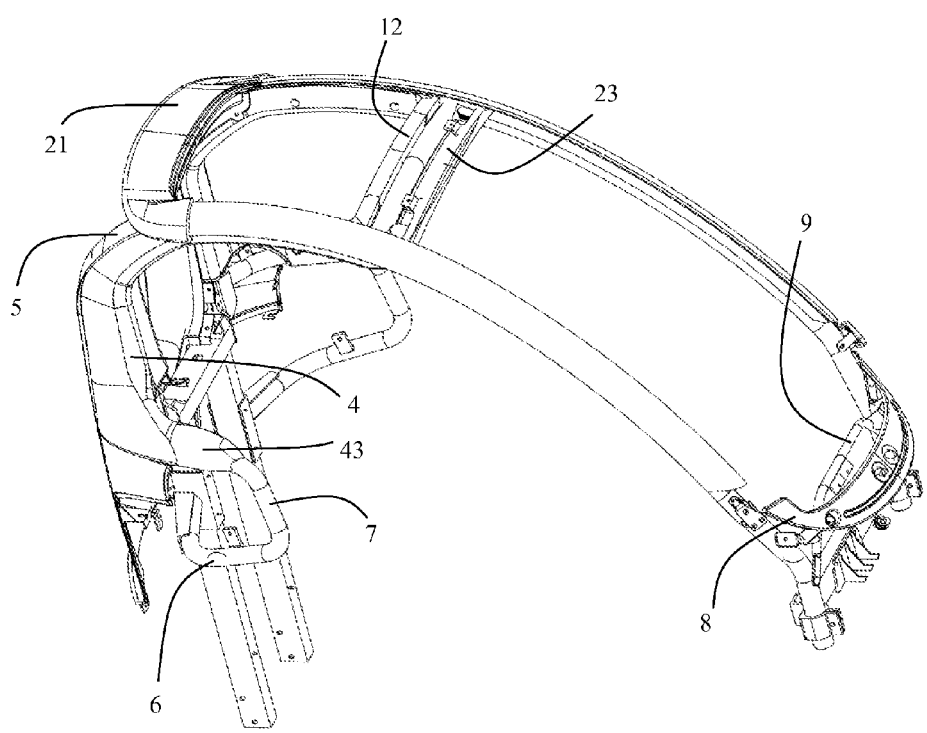
FIG. 1 is a perspective view of the canopy structure in accordance with the illustrated embodiment of the present invention.
Figure 2:
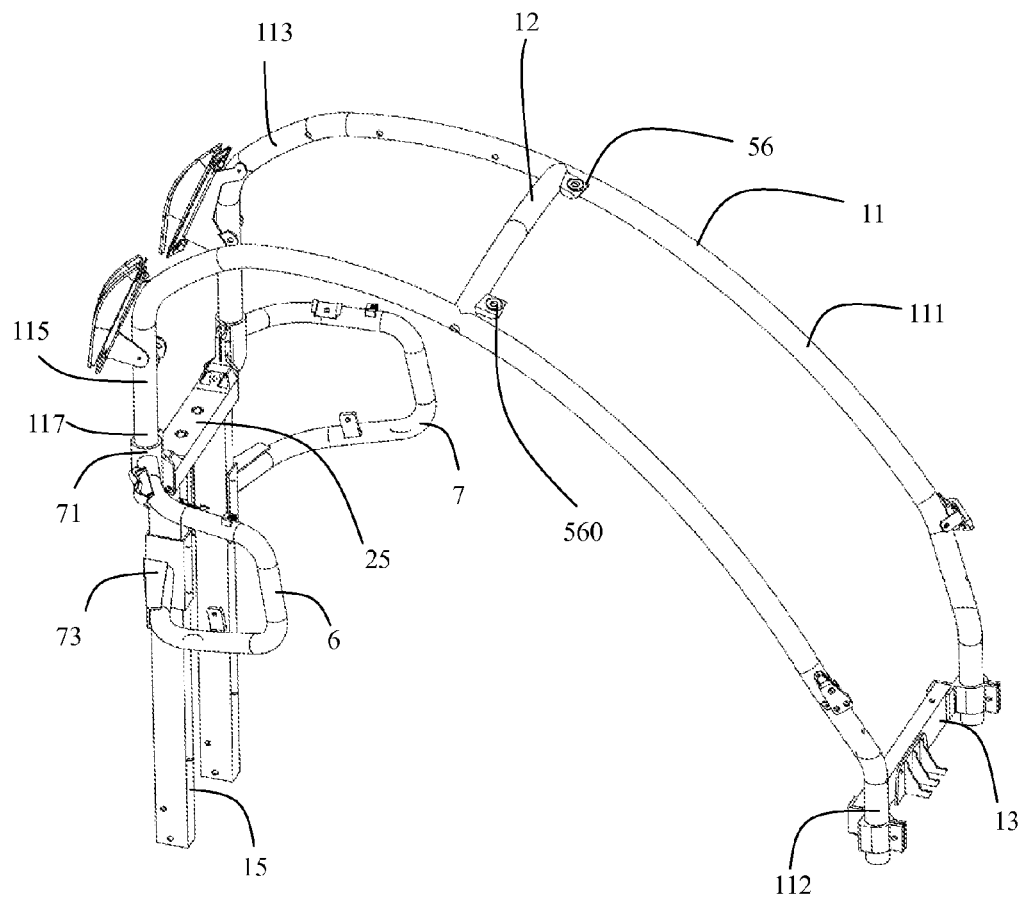
FIG. 2 is a partly perspective view of the canopy structure in accordance with the illustrated embodiment of the present invention.

In order to better understand the object, the technical solution and the advantages of the present application, the detailed description of the invention referring to the drawings will be described hereinafter.

Referring to FIGS. 1 to 6, the present application discloses a canopy structure which is applied to electrical bicycles. The canopy structure includes a framework 1. The framework 1 which has a pair of round tubes 11 spaced apart from and parallel to each other. Each of the round tube 11 has a curved portion 111, a bridge portion 113 and a vertical portion 115 extending in a vertical direction. The bridge portions 113 connect with and are located between the curved portion 111 and the vertical portion 115. An angle between the vertical portion and curved portion is acute. The framework 1 further includes a connecting member 13 connecting with free ends 112 of the curved portions 111 and is perpendicular to the pair of round tubes 11, a cross-bar 12 connecting a middle portion of the curved portions 111 and perpendicular to the pair of round tubes 11, a front ceiling beam 23 mounted on the cross-bar 12 and a rear ceiling beam 21 crossing the pair of round tubes 11 and being located at the bridge portion 113 of the pair of round tubes 11. The canopy structure further includes a pair of adhesive strips 43 disposed upon the round tubes 11 from the bridge portion 113 to the free end 112 of curved portions 111, a rear glass 53 hold in position by the adhesive strips 43 and the rear ceiling beam 21 together and a front glass 54 hold in position by the adhesive strips 43 and the front ceiling beam 23 together.

The canopy structure further includes a pair of rectangular tubes 15 extending in the vertical direction, a pair of handrails 7 and a fixing arm 25. Each of the rectangular tubes 15 connects with a free end 117 of the vertical portion 115 of the pair of round tubes 11. The fixing arm 25 is perpendicular to the vertical portion 115 of the pair of round tubes 11 and is fixed at free ends 117 of the vertical portion 115. Each of the handrails 7 defines an upper end 71 and a lower end 73. The upper ends 71 are fixed to the vertical portions 115 and close to the free ends 117 thereof. While, the lower end 73 are fixed to the according rectangular tubes 15 which connects with the vertical portions 115.

The canopy structure further includes a first support member 8 mounted at and crossing the pair of round tubes 11, a second support member 9 soldered to and crossing the pair of round tubes 11. The second support member 9 is located between the first support member 8 and the connecting member 13. The first support member 8 is closed to the connecting member 13.

Figure 3:
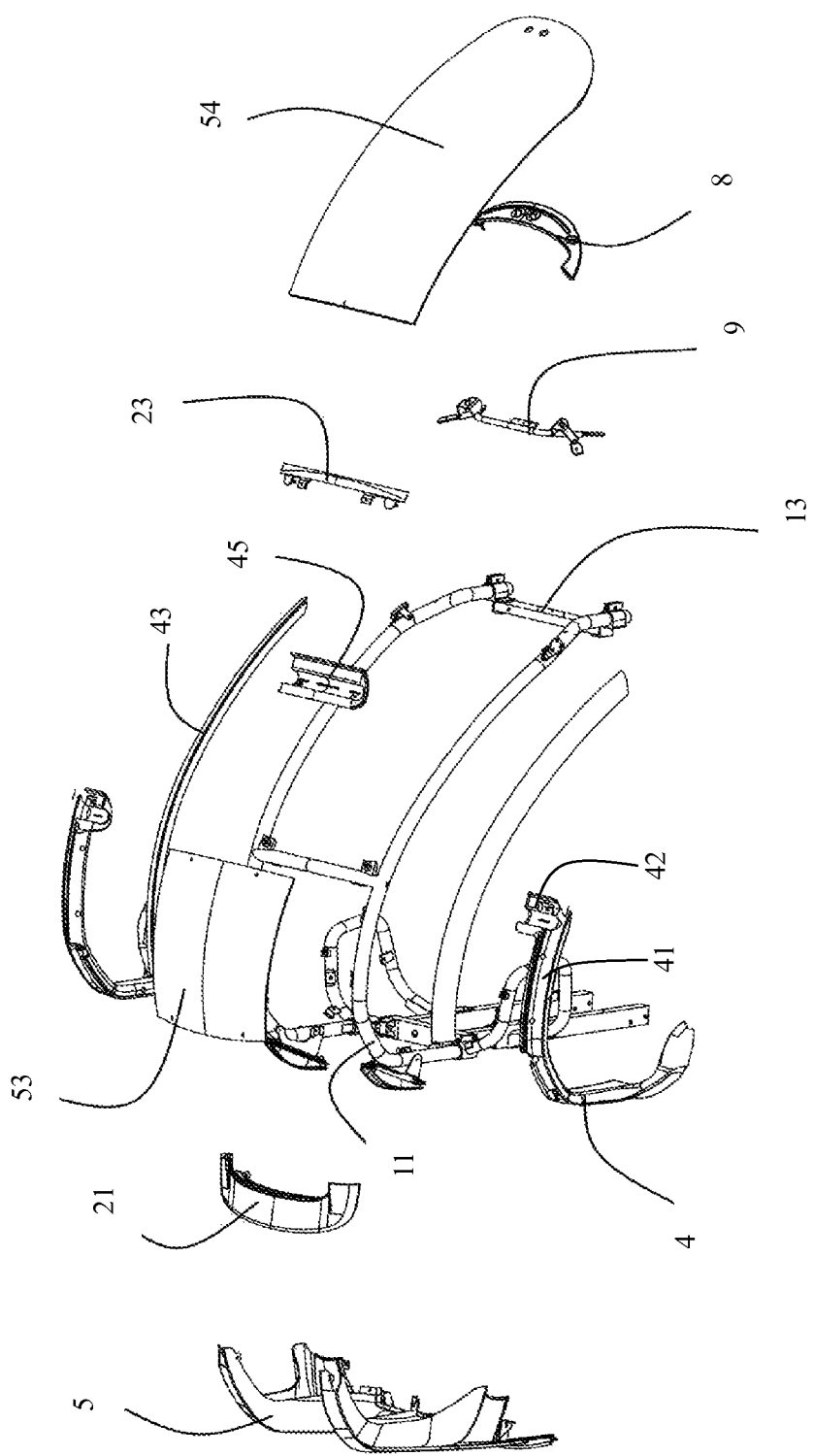
FIG. 3 is another exploded view of the canopy structure in accordance with the illustrated embodiment of the present invention.
Figure 4:
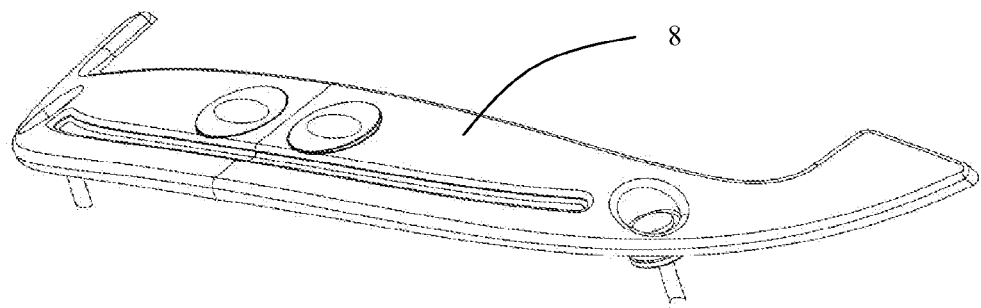
FIG. 4 is a perspective view of a first support member as shown in FIG. 3.
Figure 5:
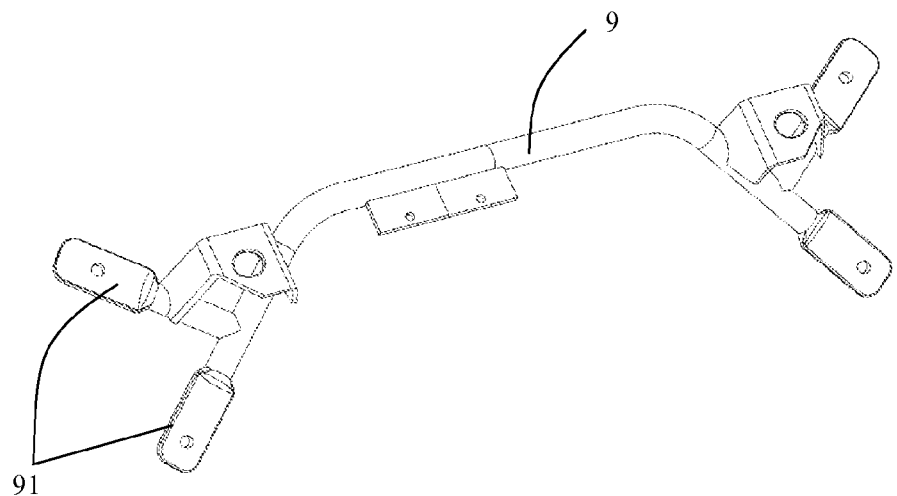
FIG. 5 is a perspective view of a second support member as shown in FIG. 3.
Figure 6:
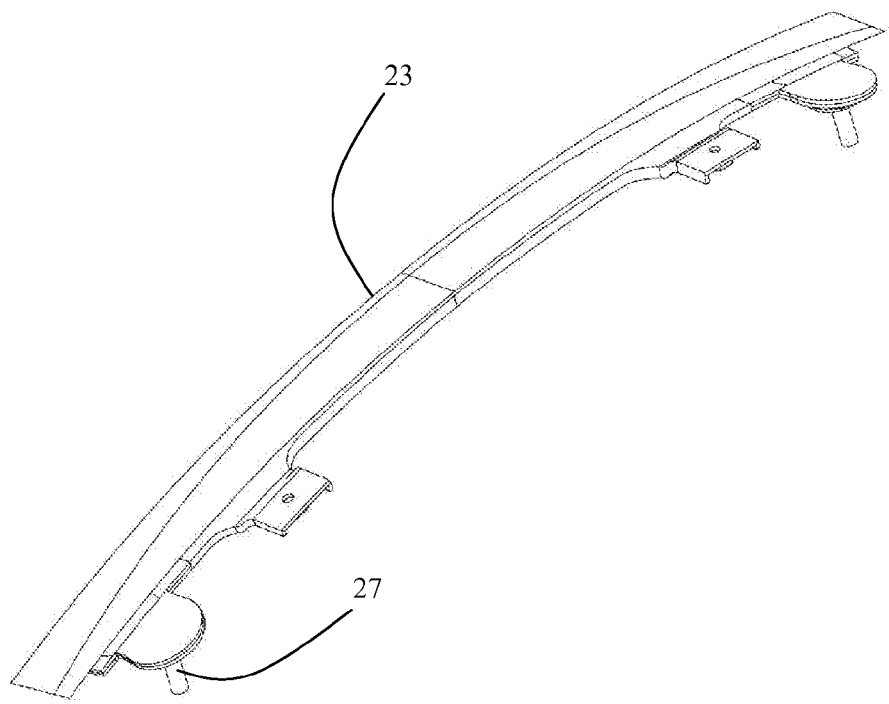
FIG. 6 is a perspective view of a front ceiling beam as shown in FIG. 3.

The canopy structure further includes a pair of inner cover 4 and a pair of rear peripheral cover 5 fixed to the round tubes 11. The inner covers 4 engage with the rear peripheral covers 5. Each of the inner cover 4 defines a main portion 41 and a perpendicular portion 42 at a free end of the main portion 41. The perpendicular portions 42 are perpendicular to the main portion 41. The main portion 41 surround an inner side of the round tubes 11. In detail, the main portion 41 surrounds an inner side of the bridge portions 113, the vertical portions 115, portions of the round tubes 11 which are between the cross-bar 12 and the bridge portions 113 and part of handrails 7 which is near the upper end 71 thereof, as shown in FIGS. 1 and 3. With this arrangement, the handrails 7 are located below the inner covers 4. The rear peripheral covers 5 surround an outer side of the round tubes 11. In detail, the rear peripheral covers 5 surround an outer side of the bridge portions 113 and the vertical portions 115. The canopy structure further includes a second inner cover 45. The perpendicular portions 42 of the inner cover 4 together with the second inner cover 45 surround an inner side of the cross-bar 12, as shown in FIG. 3.

The cross-bar 12 includes a pair of fixing portions 56 each defining a mounting hole 560. The front ceiling beam 23 includes a pair of fixing posts 27 installed in the mounting holes 560. The second support member 9 includes a pair of V-shaped pieces 91 on opposite ends thereof. The V-shaped pieces 91 lap on and are fixed to the round tubes 11.

The canopy structure further includes a safeguarding portion 6 surrounding the air of handrails 7. The safeguarding portion 6 has an outer layer and an inner layer. The outer layer is plastic and the inner layer is foam material. With the above arrangement, the safeguarding portion 6 is positioned below the inner cover 4, the front ceiling beam 23 and the rear ceiling beam 21. As a result, even if the electrical bicycle falls to the ground, the human body will contact the safeguarding portion 6. Since the safeguarding portion 6 is soft, it is well capable of buffering the human body for avoiding accident injury.

In conclusion, the description of the above embodiment is only used for the understanding of the present application. It should be noted that, those skilled in the art may make many improvements and modifications to the present application without departing from the principle of the present application, and these improvements and modifications also fall into the protection scope of the claims of the present application.

What is claimed is:

1. A canopy structure, comprising:
    a framework, which comprising:
        a pair of round tubes, which are spaced apart from and parallel to each other, each of the round tubes having a curved portion, a bridge portion and a vertical portion extending in a vertical direction, the bridge portion connecting with and being located between the curved portion and the vertical portion, an angle between the vertical portion and curved portion is acute;
        a connecting member, which connects with free ends of the curved portions of the pair of round tubes and is perpendicular to the pair of round tubes;
        a cross-bar connecting a middle portion of the curved portions of the pair of round tubes and is perpendicular to the pair of round tubes;
        a front ceiling beam, which crosses the pair of round tubes and is engaged with the cross-bar; and
        a rear ceiling beam, which crosses the pair of round tubes and is located at the bridge portion of the pair of round tubes; and
    a pair of adhesive strips, which are disposed upon the round tubes from the bridge portion to free end of curved portions;
    a rear glass, which is held in position by the adhesive strips and the rear ceiling beam together; and
    a front glass, which is held in position by the adhesive strips and the front ceiling beam together.

2. The canopy structure as claimed in claim 1, wherein the cross-bar comprises a pair of fixing portions each defining a mounting hole, and wherein the front ceiling beam comprises a pair of fixing posts engaged with mounting holes.

3. The canopy structure as claimed in claim 1, wherein the framework further comprises a pair of rectangular tubes extending in the vertical direction, each of the rectangular tubes connecting with a free end of the vertical portion of the pair of round tubes.

4. The canopy structure as claimed in claim 3, wherein the framework further comprises a fixing arm, which is perpendicular to the vertical portion of the pair of round tubes and is fixed at free ends of the vertical portion of the pair of round tubes.

5. The canopy structure as claimed in claim 4, further comprising a pair of handrails, each of the handrails defines an upper end and a lower end, the upper ends being fixed to the vertical portions of the pair of round tubes, the lower end being fixed to the rectangular tubes connecting with the vertical portions of round tubes.

6. The canopy structure as claimed in claim 5, further comprising a safeguarding portion surrounding the pair of handrails.

7. The canopy structure as claimed in claim 1, further comprising a an inner cover and a rear peripheral cover fixed to the round tubes, the inner cover engaging with the rear peripheral cover.

8. The canopy structure as claimed in claim 7, wherein each of the inner cover defines a main portion and a perpendicular portion at a free end of the main portion, the perpendicular portions being perpendicular to the main portion, and wherein the main portion surrounds an inner side of the bridge portion, the vertical portion, a portion of the round tubes which is between the cross-bar and the bridge portion and part of handrails which is near the upper end thereof, and wherein the rear peripheral cover surrounds an outer side of the bridge portion and the vertical portion.

9. The canopy structure as claimed in claim 8, further comprising a second inner cover, the perpendicular portions of the inner cover together with the second inner cover surrounding an inner side of the cross-bar.

10. The canopy structure as claimed in claim 1, further comprising a first support member mounted at and crossing the pair of round tubes and closed to the connecting member, a second support member soldered to and crossing the pair of round tubes and located between the first support member and the connecting member.

11. The canopy structure as claimed in claim 10, wherein the second support member comprises a pair of V-shaped pieces on opposite ends thereof, the V-shaped pieces lapping on and being fixed to the round tubes.

\* \* \* \* \*